United States Patent [19]
Leoni

[11] Patent Number: 5,487,854
[45] Date of Patent: Jan. 30, 1996

[54] TWO-STATE CO-CURE METHOD FOR FABRICATING A COMPOSITE ARTICLE

[75] Inventor: Peter B. Leoni, Bethany, Conn.

[73] Assignee: United Technologies Corporation, Hartford, Conn.

[21] Appl. No.: 302,288

[22] Filed: Sep. 8, 1994

[51] Int. Cl.⁶ .................................................. B29C 44/06
[52] U.S. Cl. .................... 264/46.4; 264/45.2; 264/46.6; 264/101; 264/313; 264/314; 264/338
[58] Field of Search .................................. 264/45.2, 46.4, 264/46.6, 102, 101, 313, 314, 338

[56] References Cited

U.S. PATENT DOCUMENTS

| | | | |
|---|---|---|---|
| 3,861,977 | 1/1975 | Wiley | 264/101 |
| 4,120,632 | 10/1978 | Stoeberl | 264/46.6 |
| 4,551,290 | 11/1985 | Mizell | 264/46.6 |
| 4,560,523 | 12/1985 | Plumley et al. | 264/314 |
| 4,853,172 | 8/1989 | Jacaruso et al. | 264/314 |
| 5,023,042 | 6/1991 | Efferding | 264/313 |
| 5,233,743 | 8/1993 | Robertson et al. | 264/314 |
| 5,245,770 | 9/1993 | Ko et al. | 264/46.6 |
| 5,266,249 | 11/1993 | Grimes, III et al. | 264/314 |

*Primary Examiner*—Allan R. Kuhns
*Attorney, Agent, or Firm*—Terrance J. Radke

[57] ABSTRACT

A two-stage co-cure method for fabricating a composite article having a box-beam cross-sectional configuration wherein an outer shell portion of the composite article is fabricated and configured in the first stage to function as the tooling for completing the fabrication of composite article in the second stage. The first stage includes a step wherein a molding assembly is configured to define the outer margin line surface of the outer shell, a step wherein prepreg plies forming the outer shell are layed-up in the molding assembly, a step wherein the layed-up molding assembly is vacuum bagged and evacuated in preparation for curing, a curing step, an optional step wherein the molding assembly is reconfigured as required so that the reconfigured molding assembly and the outer shell in combination define a foam injection cavity, an injecting step wherein a high temperature, high pressure foam is injected into the foam injection cavity to form an outer shell, cured foam core stabilized combination that functions as the tooling for the second stage, and a disassembly step. The second stage includes an application step wherein a film adhesive is applied to the outer shell, cured foam core stabilized combination, a step wherein prepreg plies forming an inner cap are layed-up onto the adhesive coated outer shell, cured foam core stabilized combination, a step wherein layed-up outer shell, cured foam core stabilized combination is vacuum bagged for curing, and a curing step.

5 Claims, 6 Drawing Sheets fig.1A fig.1B fig.1C fig.2A fig.2B fig.3A fig.3B fig.3C fig. 4

TWO-STATE CO-CURE METHOD FOR FABRICATING A COMPOSITE ARTICLE

The Government has rights in this invention pursuant to Contract No. DAAJ09-91-C-A004 awarded by the Department of the Army.

TECHNICAL FIELD

The present invention relates to methods for fabricating composite articles, and more particularly, to a two-stage co-cure method for molding a composite article having a box-beam cross-sectional configuration wherein an outer shell of the composite article is fabricated and configured in the first stage of the method to function as the tooling for completing the fabrication of the composite article in the second stage of the method.

BACKGROUND OF THE INVENTION

There is a continuing expansion of the use of composite materials for a diverse array of applications, especially in the aerospace field. One challenge confronting manufacturing engineers is to enhance the reproducibility of composite articles having complex configurations, e.g., to reduce the complexity of molding assemblies required to fabricate the composite article, to reduce the overall time of the manufacturing cycle required to fabricate the composite article, and to reduce the degree of manual labor required in the manufacturing cycle. This challenge is particularly pertinent in the fabrication of composite articles having a relatively complex box-beam cross-sectional configuration (complexity as used in the present context defines a composite article having a plurality of mechanical joints, i.e., locations where two or more box-beam members are structurally integrated in combination).

Of particular interest to the assignee of the present invention is enhancing the reproducibility of the structural framework of the canopy assembly of the RAH-66 Comanche helicopter (see FIGS. 1A–1C) under development by the assignee. The structural framework of this canopy assembly has a relatively complex box-beam cross-sectional configuration. Several conventional manufacturing techniques were evaluated by the manufacturing engineers of the assignee in its quest to enhance the reproducibility of the structural framework in an optimal manner, e.g., low cost, low manufacturing cycle time, low risk.

One conventional technique that was evaluated was the fabrication of the inner and outer segments separately and then subsequently joining the inner and outer segments to form the structural framework. Generally, this technique involved a relatively complex molding assembly comprising a plurality of complementary molds/tools that define the inner and outer mold line surfaces of the inner and outer segments. Due to the relatively complex configuration of the structural flamework, the optimal technique required, at a minimum, seven complementary molds/tools to fabricate the inner and outer segments (the inner segment would be fabricated as six separate components, the outer segment would be fabricated as a single component) comprising the structural framework. As one skilled in the art will appreciate, the initial capitalization costs required to provide the requisite number of sets of complementary molds/tools for full-scale production of the structural framework would greatly increase the per unit costs associated with the structural framework. In addition, the overall manufacturing cycle time and the man-hours required would be relatively high due to the necessity of fabricating seven different components for each structural framework.

Once the inner and outer segments have been fabricated as individual components, a technique must be selected for joining the individual components to form the structural framework. One conventional joining technique involves the use of mechanical fasteners to join the inner and outer segments in combination. While the use of mechanical fasteners is a satisfactory technique, there are several drawbacks involved in the use of mechanical fasteners. First, the use of mechanical fasteners is highly labor intensive, e.g., drilling the necessary fasteners holes, installing the fasteners, which significantly increases the overall per unit costs associated with the structural framework as well the overall manufacturing cycle time. For the structural framework described hereinbelow in further detail, it was estimated that eight hundred mechanical fasteners would be required to mechanically join the inner and outer segments. In addition, since the structural framework has a box-beam cross-sectional configuration, conventional upset-type mechanical fasteners cannot be used since the box-beam configuration does not permit access to the interior of the structural framework for the upsetting procedure. Hence, blind fasteners must be used, and blind fasteners are relatively costly (approximately $10/fastener). Further, the use of blind fasteners entails a high risk since the integrity of the mechanical connections provided by the blind fasteners cannot be visually verified due to the box-beam configuration.

Another conventional joining technique involves the use of a bonding agent, e.g., a thermoplastic material such as polyetheretherketone (PEEK), to join the inner and outer segments in combination. While this technique is also satisfactory, there are several drawbacks. A bonding fixture is required to maintain the various components comprising in the inner and outer segments in proper bonding position. Such bonding fixtures are expensive, due to the necessity to fabricate such fixtures to very precise dimensional tolerances, and represent an initial capital outlay for full-scale production that would increase the per units costs associated with the structural framework. In addition, it may be difficult to achieve a satisfactory bond between the inner and outer segments since it is difficult to exert an outward pressure between the inner and outer segments due to the box-beam configuration. Further, it is difficult to ensure that sufficient thermal energy is provided to the bonding agent to form an acceptable bond.

A need exists to provide a method for enhancing the reproducibility of composite articles having a box-beam cross-sectional configuration such as the structural framework of a helicopter canopy assembly. The method should eliminate the need to utilize a relatively complex molding assembly, i.e., a plurality of complementary molds/tools that define the inner and outer mold line surfaces of the inner and outer segments comprising the composite article to be fabricated, and/or an expensive bonding fixture.

SUMMARY OF THE INVENTION

One object of the present invention is to provide a two-stage co-cure method for fabricating a composite article having a box-beam cross-sectional configuration that eliminates the need to utilize a conventional molding assembly, i.e., a plurality of complementary molds/tools that in combination define the complete outer mold line surface of the composite article, and/or an expensive bonding fixture.

Another object of the present invention is to provide the two-stage co-cure method according to the present invention wherein an outer shell of the composite article to be fabricated is fabricated and configured in a first-stage process of the two-stage co-cure method to function as the tooling for fabricating the remainder of the composite article in a second-stage process.

These and other objects of the present invention are achieved by a two-stage co-cure method for fabricating a composite article having a box-beam cross-sectional configuration that comprises a first-stage process and a second-stage process. During the first-stage process an outer shell portion of the composite article is fabricated and configured to function as the tooling for completing the fabrication of composite article in the second-stage process. The first-stage process comprises a set-up step wherein primary mandrels are mounted in combination with a base mold member to provide a molding assembly that is configured to define the outer margin line surface of the outer shell of the composite article to be fabricated, a lay-up step wherein prepreg plies that comprise the outer shell are layed-up in the molding assembly, a vacuum-bagging step wherein the layed-up molding assembly is vacuum bagged and evacuated in preparation for curing, a curing step wherein the vacuum-bagged molding assembly is subjected to elevated temperature and pressure to cure the prepreg plies to form the outer shell, a de-bagging step wherein the vacuum bag is removed, an optional reconfiguration step wherein the molding assembly is reconfigured as required by mounting secondary mandrels in combination with the base mold member so that the reconfigured molding assembly and the outer shell in combination define a foam injection cavity, a securing step wherein cover plates are secured in combination with the reconfigured molding assembly to provide closure of the foam injection cavity, and an injecting step wherein a high temperature, high pressure foam is injected into the foam injection cavity and cured at room temperature to form an outer shell, cured foam core stabilized combination. The outer shell, cured foam core stabilized combination functions as the tooling for the second stage by defining the inner mold line surface of an inner cap of the composite article to be manufactured. The final step in the first-stage process comprises a disassembly step wherein the cover plates are removed from the reconfigured molding assembly and the reconfigured molding assembly is disassembled by removing the primary and secondary mandrels from the base mold member to expose the outer shell, cured foam core stabilized combination.

The second-stage process comprises an application step wherein a film adhesive is applied to the outer shell, cured foam core stabilized combination, a lay-up step wherein prepreg plies that comprise the inner cap are layed-up onto the adhesive coated outer shell, cured foam core stabilized combination, a vacuum-bagging step wherein layed-up outer shell, cured foam core stabilized combination is vacuum bagged for curing, and a curing step wherein the vacuum-bagged, layed-up outer shell, cured foam core stabilized combination is subjected to elevated temperature and pressure to cure the prepreg plies to form the inner shell, and to concomitantly cause the applied film adhesive to fuse wherein the inner cap and the outer shell are adhesively bonded in combination to form the composite article having the box-beam cross-sectional configuration.

BRIEF DESCRIPTION OF THE DRAWINGS

A more complete understanding of the present invention and the attendant features and advantages thereof may be had by reference to the following detailed description of the invention when considered in conjunction with the accompanying drawings wherein.

BEST MODE OF CARRYING OUT THE INVENTION

The present invention is directed to a two-stage co-cure method for fabricating a composite article having a box-beam cross-sectional configuration without the need for utilizing a conventional molding assembly, i.e., a plurality complementary molds/tools that in combination define the complete outer mold line (OML) structural configuration of the composite article. The method according to the present invention utilizes a portion of the composite article fabricated in the first stage of the two-stage co-cure method as tooling for fabricating the remainder of the composite article in the second stage of the method. The molding apparatus utilized in the two-stage co-cure method according to the present invention and the steps of the method are described herein in terms of the fabrication of the structural framework of the canopy assembly of the RAH-66 Comanche helicopter prototype being fabricated by the Sikorsky Aircraft Division of United Technologies Corporation.

Figure 1A:
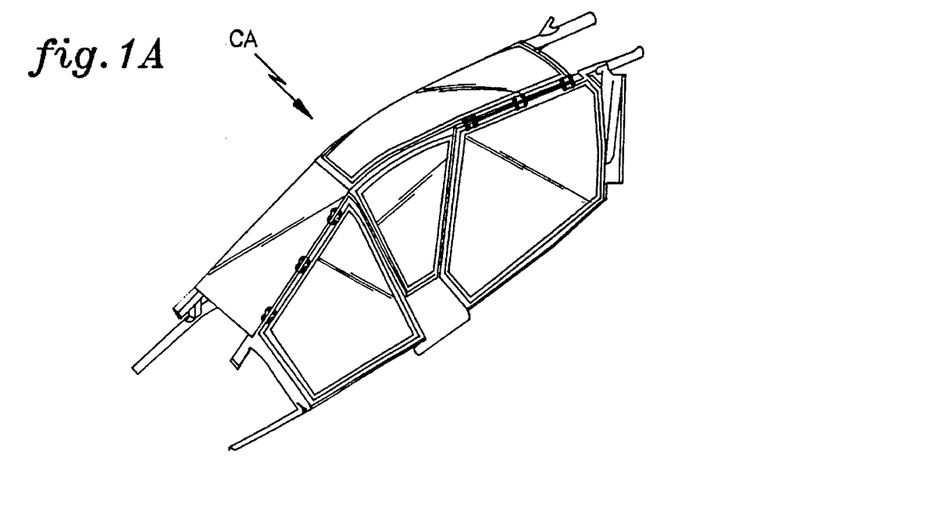
FIG. 1A is a perspective view of the canopy assembly for the RAH-66 Comanche helicopter.
Figures 1B, 1C:
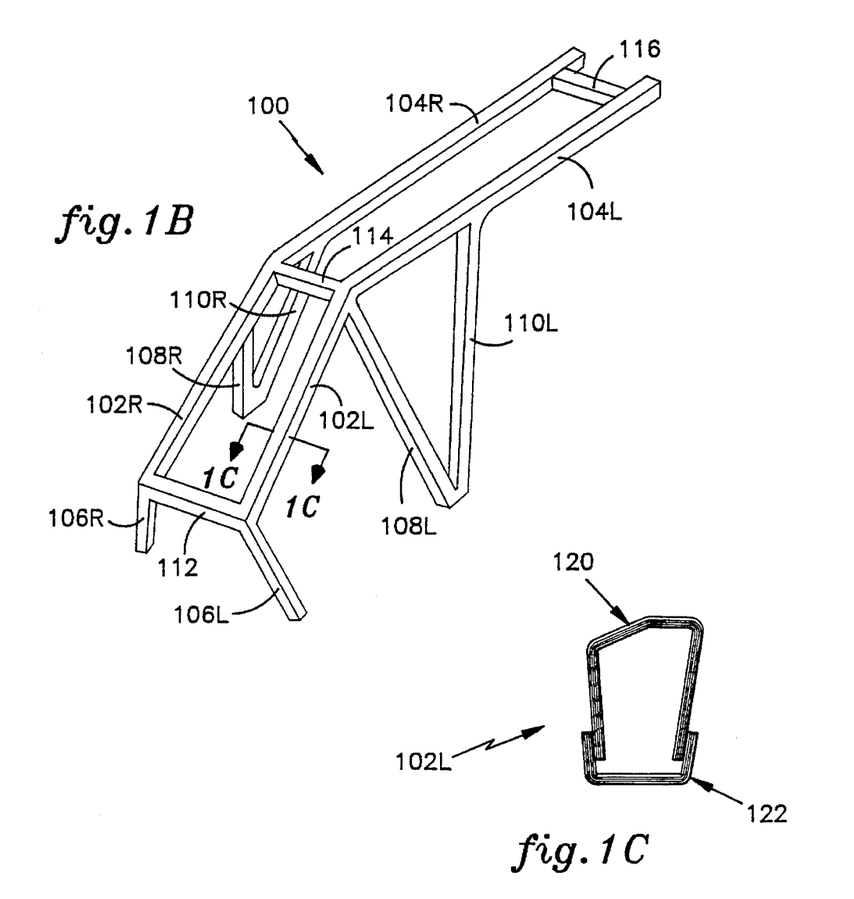
FIG. 1B is a perspective of the structural framework of the canopy assembly of FIG. 1A.
FIG. 1C is an exemplary cross-sectional view of the structural framework of Figure 1B taken along line 1C—1C thereof.

Referring now to the drawings wherein like reference characters identify corresponding or similar elements throughout the several views, the canopy assembly CA is exemplarily illustrated in FIG. 1A and the structural framework 100 of the canopy assembly CA is illustrated in FIG. 1B. The structural framework 100 comprises left and right windshield rails 102L, 102R, left and right overhead rails 104L, 104R, left and right forward sideposts 106L, 106R, left and right, first and second intermediate sideposts 108L, 108R, 110L, 110R, respectively, a forward transverse post 112, an overhead transverse post 114, and a rear transverse post 116. FIG. 1C is a cross-sectional view illustrating the box-beam configuration of the left windshield rail 102L, which is representative of the overall cross-sectional configuration of the posts and rails comprising the structural framework 100. The box-beam configuration of the left windshield rail 102L is comprised of a composite outer shell 120 and a composite inner cap 122 in bonded combination. While the two-stage co-cure method of the present invention is described herein in terms of a specific application, i.e., fabrication of the structural framework 100 described hereinabove, one skilled in the art will appreciate that the two-stage co-cure method of the present invention has utility in fabricating other types of composite articles.

FIGS. 2A, 2B, and 3A–3C illustrate an exemplary female molding assembly 50 for use in the two-stage co-cure method according to the present invention. The illustrated female molding assembly 50 is configured for fabricating the structural framework 100 illustrated in Figure 1B. The female molding assembly 50 comprises a base mold member 52 having contoured molding surfaces 54 formed therein. The contoured molding surfaces 54 define at least a portion of the OML surface of the outer shell 120 of the structural framework 100. For example, compare FIG. 3A wherein the contoured molding surface 54 defines less than fifty percent of the OML surface of the outer shell 120 with FIG. 3C wherein the contoured molding surface 54 completely defines the OML surface of the outer shell 120.

The female molding assembly 50 further comprises a plurality of primary mandrels 56, as required, that are mounted in combination with the base mold member 52 adjacent the contoured molding surfaces 54 to further define the OML surface of the outer shell 120 of the structural framework 100. For example, in FIG. 3A the female molding assembly 50 requires two primary mandrels 56, in addition to the contoured molding surface 54, to completely define the corresponding segment of the OML surface of the outer shell 120 while in FIG. 3B the female molding assembly 50 requires only a single primary mandrel 56, in addition to the contoured molding surface 54, to completely define the corresponding segment of the OML surface of the outer shell 120. An examination of FIG. 3C shows that no primary mandrels 56 are required to define the corresponding segment of the OML surface of the outer shell 120. One skilled in the art will appreciate that the number of primary mandrels 56 required to define the corresponding OML surfaces of the composite article to be fabricated, and the mounting positions thereof on the base mold member 52, depends upon the structural complexity of the composite article to be fabricated. For the described embodiment of the female molding assembly 50, the primary mandrels 56 are bolted in combination with the base mold member 52. The base mold member 52 and the mandrels 56 of the described embodiment of the female molding assembly 50 are formed from INVAR®, a trademarked material that is an iron-nickel alloy containing 40–50% nickel and characterized by an extremely low coefficient of thermal expansion. By forming the female molding assembly 50 from a low coefficient of thermal expansion material such as INVAR®, the configuration-defining surfaces of the female molding assembly 50, i.e., the contoured molding surfaces 54 and the corresponding molding surfaces 56A (see FIG. 3A) of the primary mandrels 56, define the net OML surface dimensions of the outer shell 120.

The outer shell 120 and the inner cap 122 of the structural framework 100 are formed from a plurality of prepreg plies. For the described embodiment wherein the end product is the structural framework 100 of the Comanche canopy assembly CA, the prepreg plies are a combination of woven and unidirectional graphite material, e.g., IM7, embedded in a matrix of high temperature epoxy resin such as 8552. The prepreg plies preferably have a net resin configuration, that is, there is no excess resin in the resin matrix of the prepreg plies. For the described embodiment, i.e., the structural framework 100 of the Comanche canopy assembly CA, the prepreg plies comprise about 37% resin matrix and about 63% graphite fibers. Those skilled in the art will appreciate that other resin matrices and/or other types of fiber reinforcements may be utilized to form prepreg plies for use in the two-stage co-cure method according to the present invention and still be within the scope of the present invention.

The ultimate cost of a composite article fabricated using the two-stage co-cure method of the present invention depends in part on the overall cycle time of the two-stage co-cure method. And, in particular, that portion of the overall cycle time involved in the lay-up of prepreg plies that form the outer shell 120 and the inner cap 122. To further enhance the efficaciousness of the two-stage co-cure method according to the present invention, the prepreg plies that are layed-up to form the outer shell 120 and the inner cap 120 may be preformed into ply packs prior to implementing the two-stage co-cure method, thereby significantly reducing the overall cycle time by reducing the time required for lay-up of the prepreg plies. Male preform molds are fabricated, e.g., from wood and/or metal, that correspond to the inner mold line (IML) surfaces of the outer shell 120 and the inner cap 122. A plurality of individual prepreg plies are layed-up on respective preform molds to form ply packs that comprise the structural configuration of the outer shell 120 and the inner cap 122. The preformed ply packs are typically stored in a refrigerated environment until the implementation of the two-stage co-cure method.

Figure 4:
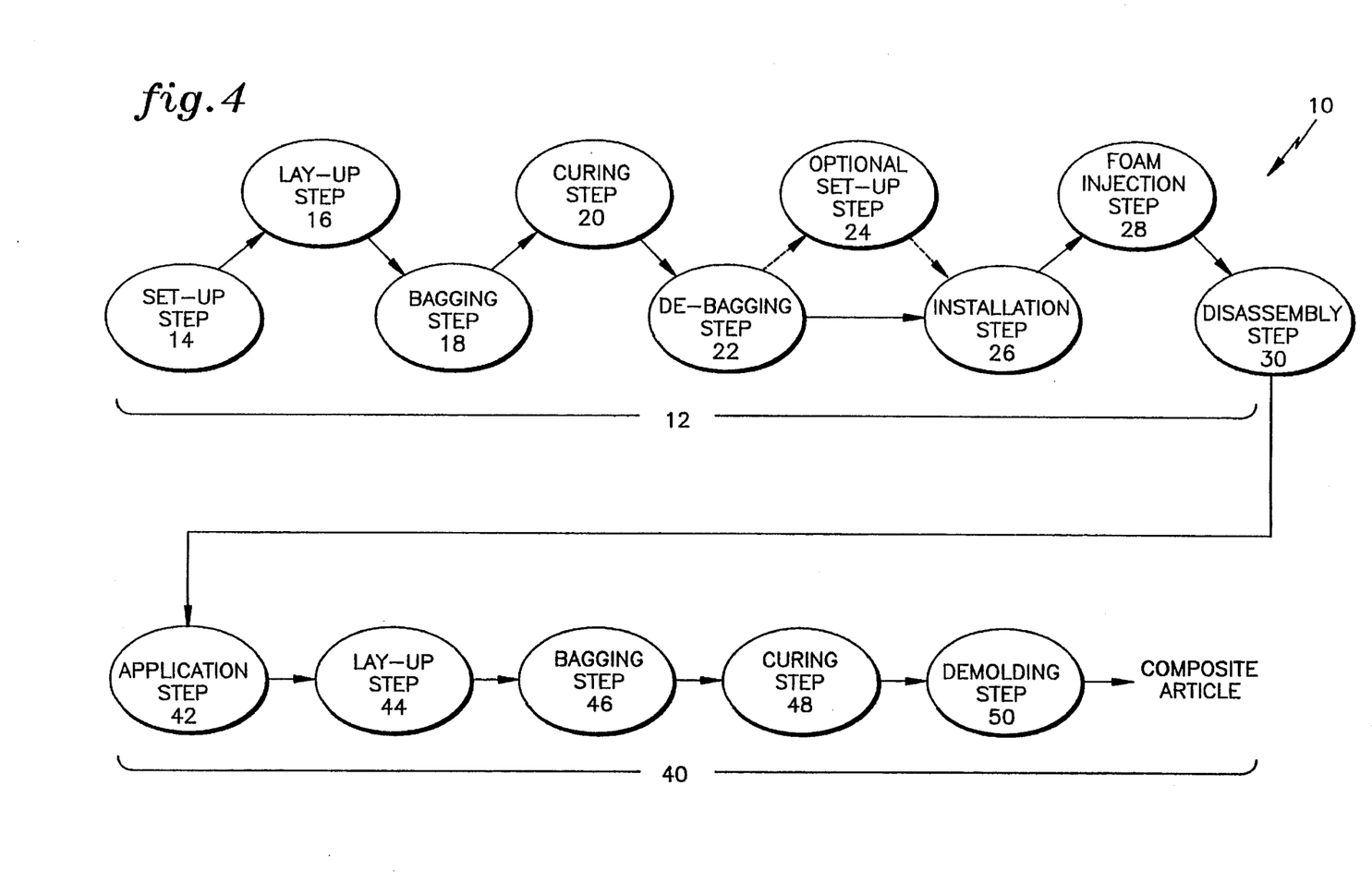
FIG. 4 is a schematic illustration of the steps of the two-stage co-cure method according to the present invention.

The two-stage co-cure method 10 according to the present invention is schematically illustrated in FIG. 4 and comprises a first-stage process 12 and a second-stage process 40. During the first-stage process 12 the outer shell 120 of the structural framework 100 is first fabricated and then the outer shell 120 is configured to function as the tooling for the second-stage process 40. In the second-stage process 40 the prepreg plies forming the inner cap 122 are layed-up in combination with the configured outer shell 120 and co-cured and bonded in combination therewith to form the structural framework 100.

The first-stage process 12 comprises a set-up step 14, a lay-up step 16, a bagging step 18, a curing step 20, a de-bagging step 22, an optional set-up step 24, an installation step 26, a foam injection step 28, and a disassembly step 30. Steps 14–22 of the first-stage process 12 are directed to the fabrication of the outer shell 120. The remainder of the steps of the first-stage process 12, i.e., steps 24–30, are directed to configuring the outer shell 120 so that the configured outer shell 120 functions as tooling for the second-stage process 40 of the two-stage co-cure method 10 according to the present invention.

In the set-up step 14, the female molding assembly 50 is configured to define the OML surfaces of the outer shell 120 by mounting the primary mandrels 56 in combination with the base mold member 52 as required so that the contoured molding surfaces 54 and the corresponding mandrel molding surfaces 56A, as applicable, define the OML surface of the outer shell 120. As an ancillary substep after the set-up step 14, or as a preliminary substep prior to the lay-up step 16, the contoured molding surfaces 54 and the corresponding mandrel molding surfaces 56A may be sprayed with a mold release agent to facilitate removal of the primary mandrels 56 in the disassembly step 30. Mold release agents having utility for this type of application are generally known to those skilled in the art, as for example, MS-412 (available from Miller Stevenson Co., Danbury, Conn.), a sprayable liquid consisting of 4% TEFLON® (TEFLON is a registered trademark of E. I. du Pont de Nemours & Co., Wilmington, Del., for tetrafluoroethylene fluorocarbon polymers or fluorinated ethylene-propylene resins) dispersed in a 96% carrier mix of alcohol and freon.

The prepreg plies $PP_{120}$ (see, e.g., FIGS. 3A–3C) that form the outer shell 120 are layed-up in the female molding assembly 50 in the lay-up step 16. As disclosed hereinabove, the prepreg plies $PP_{120}$ comprising the outer shell 120 may be preformed as ply packs. It is to be understood, therefore, that the term "prepreg plies $PP_{120}$" (or "prepreg plies $PP_{122}$" as described in further detail hereinbelow) as used herein encompasses either (or both) individual prepreg plies or a plurality of prepreg plies that have been preformed as ply packs using the preform molds described hereinabove.

Figure 3A:
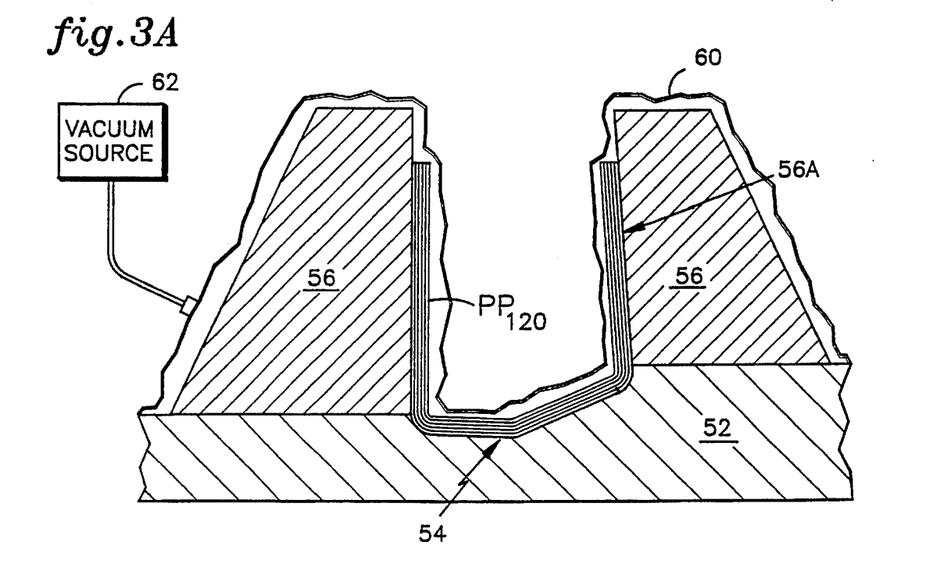
FIG. 3A is a first cross-sectional view of the female molding assembly used in the two-stage co-cure method according to the present invention taken at point A of FIG. 2A.
Figure 3B:
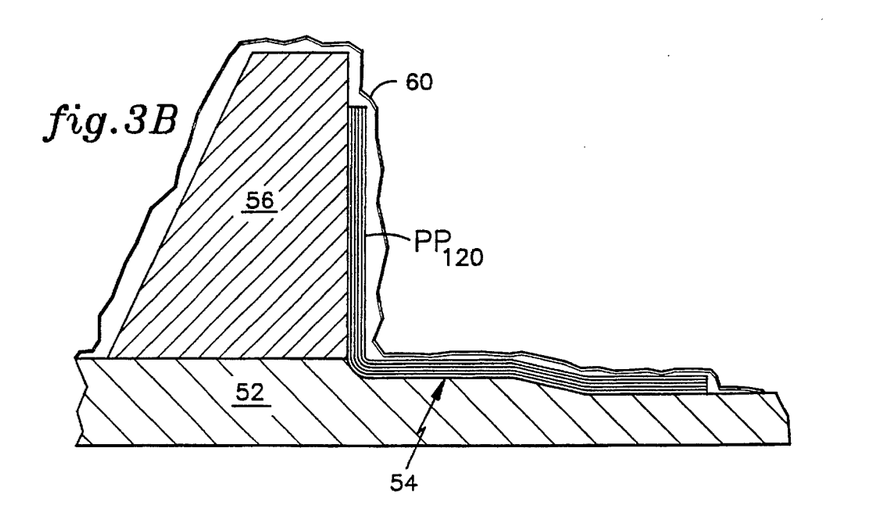
FIG. 3B is a second cross-sectional view of the female molding assembly used in the two-stage co-cure method according to the present invention taken at point B of FIG. 2A.
Figure 3C:
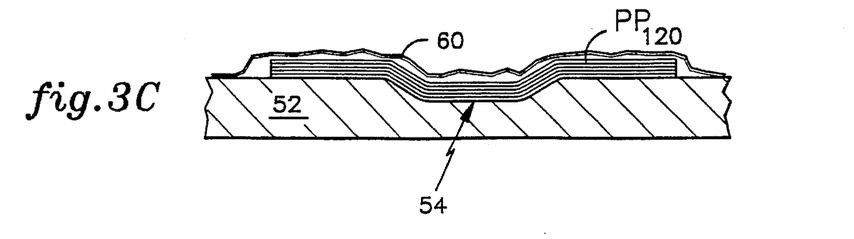
FIG. 3C is a third cross-sectional view of the female molding assembly used in the two-stage co-cure method according to the present invention taken at point C of FIG. 2A.

The layed-up female molding assembly 50 is then vacuum-bagged in the bagging step 18 as exemplarily illustrated in FIGS. 3A–3C. A vacuum bag 60 of a type known to those skilled in the art, e.g., silicone rubber, is installed over the layed-up prepreg plies $PP_{120}$, the primary mandrels 56, and the base mold member 52, as appropriate, and the edges of the vacuum bag 60 are then sealed in combination with the female molding assembly 50 to define a mold cavity. A vacuum source 62 (schematically illustrated in FIG. 3A) is interconnected to the vacuum bag 60 and operated to evacuate air and any volatiles from the mold cavity and to cause conformance of the vacuum bag 60 against the layed-up prepreg plies $PP_{120}$.

In the curing step 20, the vacuum-bagged female molding assembly 50 is subjected to a first-stage curing cycle (typically, as is known to those skilled in the art, by inserting the vacuum-bagged female molding assembly 50 into an autoclave) wherein the layed-up prepreg plies $PP_{120}$ are cured to form the outer shell 120 of the structural framework 100. For the described embodiment, the vacuum-bagged female molding assembly 50 is subjected to approximately 75 psi and a temperature of about 350° F. for a first-stage cure period of about two hours. After the first-stage cure period has elapsed, the vacuum bag 60 is removed from the female molding assembly 50 in the debagging step 22 to complete the outer shell 120 fabrication portion of the first-stage process 12 of the two-stage co-cure method 10 according to the present invention.

The optional set-up step 32 may or may not be required, depending upon the number of primary mandrels 56 mounted in combination with the base mold member 52, which in turn depends upon the particular configuration and/or complexity of the composite article being fabricated. The optional set-up step 32 reconfigures the female molding assembly 50 as necessary so that the outer shell 120 may be modified, by means of the installation and foam injection steps 26, 28, to function as the tooling for the second-stage process 40 of the two-stage co-cure method 10. The reconfiguration of the female molding assembly 50 ensures that the reconfigured female molding assembly 50, in interactive combination with applicable segments of the outer shell 120, define a foam injection cavity 130 as exemplarily illustrated in FIGS. 5A–5C.

Figure 5A:
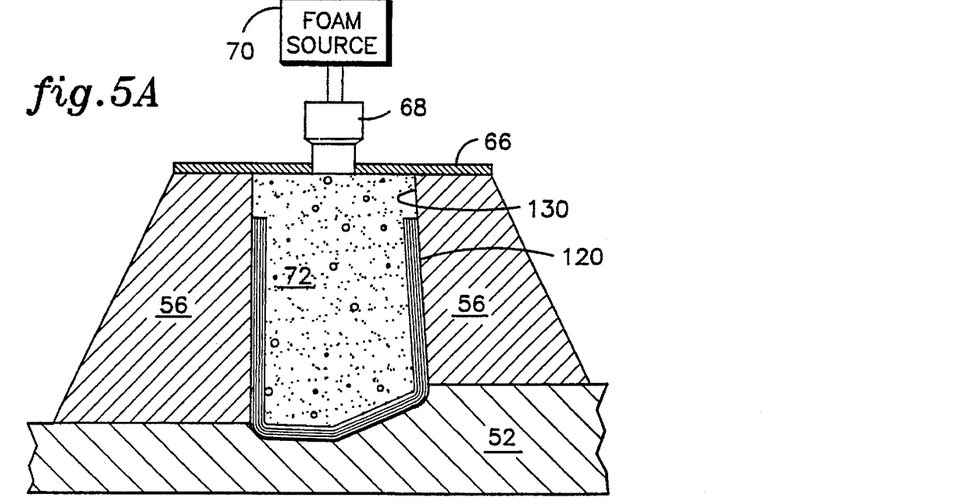
FIG. 5A is another first cross-sectional view of the female molding assembly used in the two-stage co-cure method according to the present invention.

For example, with respect to the described embodiment presented herein, the portion of the female molding assembly 50 illustrated in FIG. 5A does not require reconfiguration inasmuch as the outer shell 120 defines a foam injection cavity 130. Conversely, however, the portion of the female molding assembly 50 illustrated in FIG. 5B requires partial reconfiguration and the portion of the female molding assembly 50 illustrated in FIG. 5C requires complete reconfiguration so that the reconfigured female molding assembly 50, interactive combination with the corresponding surface of the outer shell 120, defines the foam injection cavity 130. In the optional set-up step 32, secondary mandrels 64 are mounted in combination with the base mold member 52 in abutting engagement with the outer shell 120 as exemplarily illustrated in FIGS. 5B, 5C so that the relevant surfaces thereof (identified by reference character 64A in FIGS. 5B, 5C) form the required foam injection cavity 130.

Figure 2A:
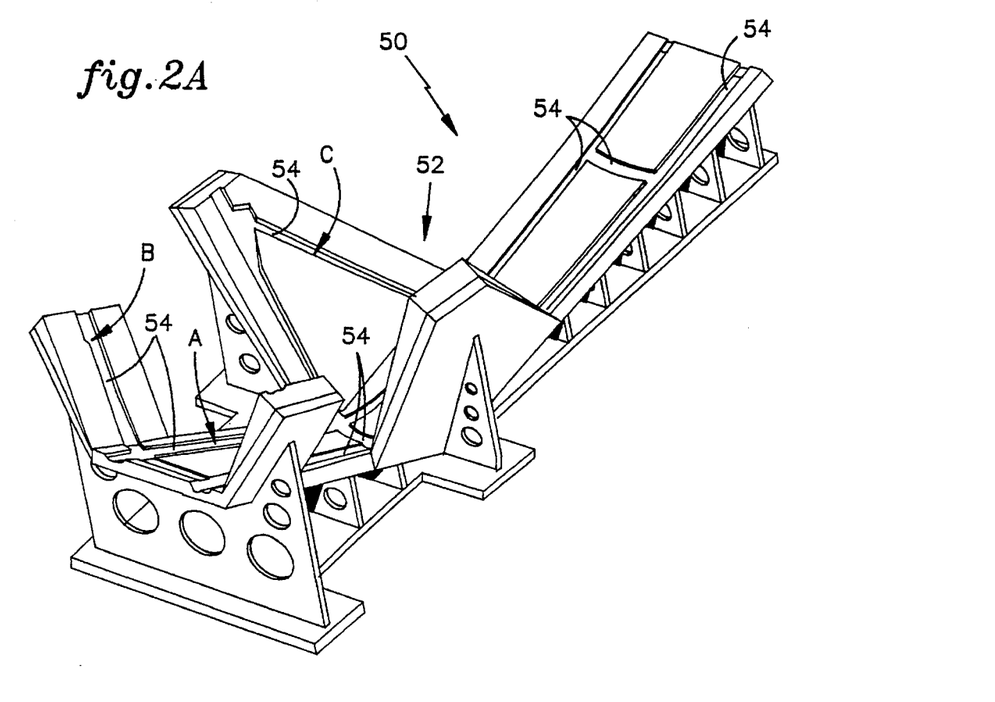
FIG. 2A is a perspective view of a base mold member of a female molding assembly for use in the two-stage co-cure method of the present invention.
Figure 2B:
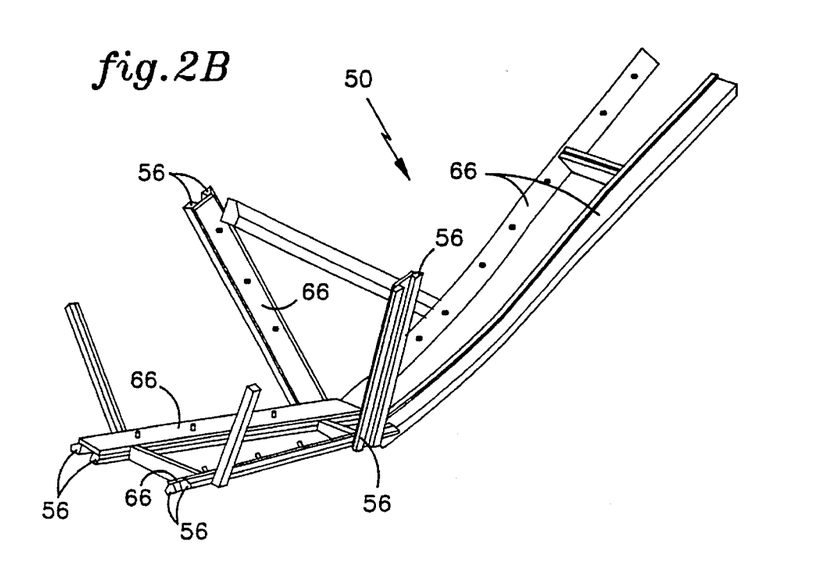
FIG. 2B is a perspective view of the primary mandrels and cover plates for the female molding assembly of FIG. 2A.
Figure 5B:
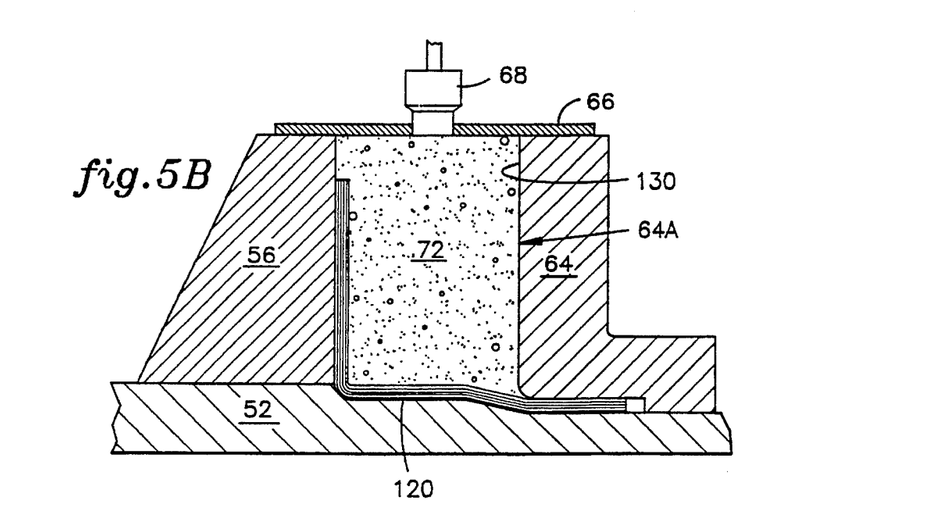
FIG. 5B is another second cross-sectional view of the female molding assembly used in the two-stage co-cure method according to the present invention.
Figure 5C:
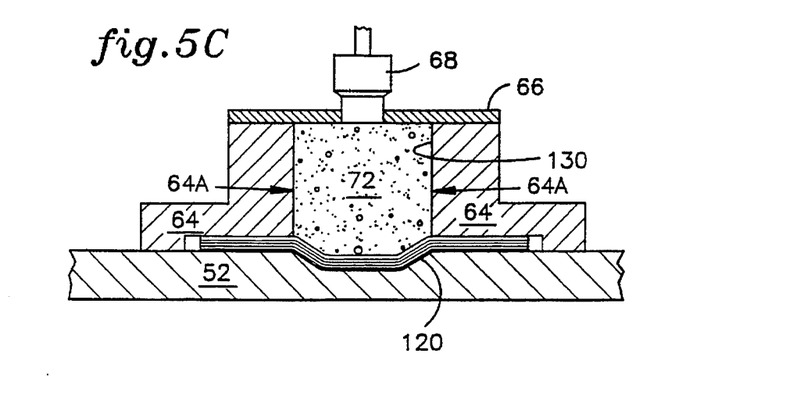
FIG. 5C is another third cross-sectional view of the female molding assembly used in the two-stage co-cure method according to the present invention.

After reconfiguration of the female molding assembly 50 as required, cover plates 66 are secured in combination with the primary mandrels 56 and/or the secondary mandrels 64 in the installation step 26 as exemplarily illustrated in FIGS. 5A–5C (see also FIG. 2B). The cover plates 66 provide closure of the foam injection cavity 130 described in the preceding paragraph. One or more of the cover plates 66 has a foam injection nozzle 68 extending therethrough and fluidically interconnected to a foam source (schematically illustrated by reference numeral 70). For the described embodiment, only two foam injection nozzles 68 are sufficient to inject the required volume of foam into the foam injection cavity 130 in a short period of time.

In the foam injection step 28, a high density, high pressure foam is injected into the foam injection cavity 130 utilizing the foam injection nozzles 68. The terms high density and high pressure as used herein in connection with the injected foam define a hardened foam that has a density within the range of about 10 pounds/ft$^3$ to about 18 pounds/ft$^3$ and the capability of withstanding the pressures and temperature incurred during the cure cycle of the second-stage process 40, i.e., non-collapsible. For the described embodiment, the pressures which may be exerted during the second-stage cure cycle are within the range of about 35 psi to about 75 psi. One example of a preferred foam that has utility in the practice of the two-stage co-cure method 10 according to the present invention is a polyisocyanurate foam such as Dow Chemical's Papi-580/XUS-15314.00L. The foam may be preheated prior to injection to lower the viscosity thereof to improve the flow characteristics thereof to facilitate filling of the foam injection cavity 130. The injected foam is allowed to cure at room temperature to form a foam core 72 (see FIGS. 5A–5C) that is mechanically interlocked with the outer shell 120, i.e., a modified outer shell 120. The curing time for polyisocyanurate foam is about ten seconds.

Once the injected foam is cured, the cover plate members 66 are removed from the primary mandrels 56 and/or the secondary mandrels 64 as the initial substep of the disassembly step 30. Next, all of the primary mandrels 56, and any secondary mandrels 64 that were installed, are disengaged and removed from the base mold member 52 to complete the disassembly step 30 (and concomitantly, the first-stage process 12 of the two-stage co-cure method 10 of the present invention. At this juncture in the two-stage co-cure method 10, the outer shell 120 with the cured foam core 72 mechanically locked in combination therewith forms a stabilized combination that rests in the contoured molding surfaces 54 of the base mold member 52 (see FIGS. 6A–6C). The outer shell 120, cured foam core 72 stabilized combination functions as the mold tooling for the lay-up of the prepreg plies comprising the inner cap 122 of the structural framework 100.

Figure 6A:
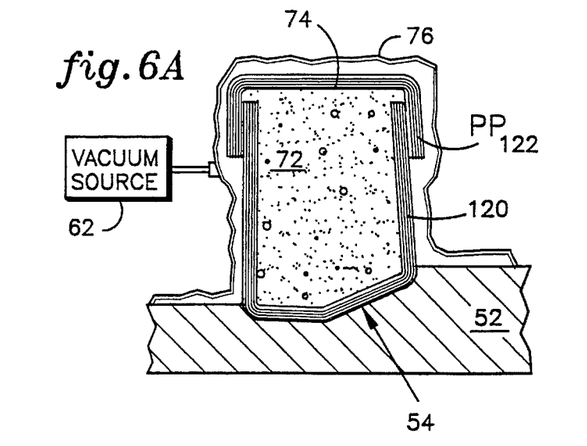
FIG. 6A is a further first cross-sectional view of the female molding assembly used in the two-stage co-cure method according to the present invention.
Figure 6B:
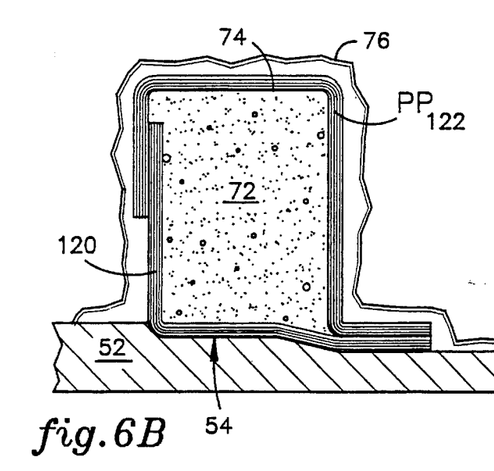
FIG. 6B is a further second cross-sectional view of the female molding assembly used in the two-stage co-cure method according to the present invention.
Figure 6C:
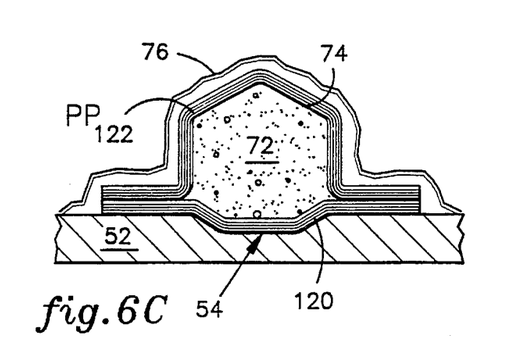
FIG. 6C is a further third cross-sectional view of the female molding assembly used in the two-stage co-cure method according to the present invention.

The second-stage process 40 includes an application step 42, a lay-up step 44, a vacuum bagging step 46, a curing step 48, and a demolding step 50. With reference to FIGS. 6A–6C, a film adhesive 74 is applied in application step 42 to the surfaces of the outer shell 120, cured foam core 72 stabilized combination that physically engage the IML surface of the inner cap 122. The film adhesive 74 functions to provide the bond between the outer shell 120 and the inner cap 122 to form the structural framework 100. Film adhesives for this type of application are known to those skilled in the art. For the described embodiment, the film adhesive is a 0.06 wt film adhesive such as 1113 that is available from Metal Bond.

Next, the prepreg plies PP$_{122}$ that form the inner cap 122 are layed-up onto the film adhesive 74 applied to the outer shell 122, cured foam core 72 stabilized combination in step 42 as illustrated in FIGS. 6A–6C. As described hereinabove, the prepreg plies PP$_{122}$ forming the inner cap 122 may be preformed as ply packs, which may layed-up in the lay-up step 44.

The layed-up base mold member 52 is then vacuum-bagged in the bagging step 44 as exemplarily illustrated in FIGS. 6A–6C. A vacuum bag 76 of a type known to those skilled in the art is installed over the layed-up prepreg plies PP$_{122}$ that comprise the inner cap 122 and the outer shell 120, cured foam core 72 stabilized combination in the base mold member 52, and the edges of the vacuum bag 76 are sealed in combination with the base mold member 52. The vacuum source 62 (schematically illustrated in FIG. 6A) is interconnected to the vacuum bag 76 and operated to evacuate air and any volatiles from within the sealed vacuum bag 76 and to cause conformance of the vacuum bag 76 against the layed-up prepreg plies PP$_{122}$ that comprise the inner cap 122.

In the curing step 48, the vacuum-bagged base mold member 52 is subjected to a second-stage curing cycle (typically, as is known to those skilled in the art, by inserting the vacuum-bagged base mold member 52 into an autoclave) wherein the layed-up prepreg plies PP$_{122}$ that comprise the inner cap 122 are cured, and concomitantly the film adhesive 74 fuses to adhesively bond the inner cap 122 and the outer shell 120 in combination. For the described embodiment, the vacuum-bagged base mold member 52 is subjected to a pressure of approximately 45 psi and a temperature of about 350° F. for a second-stage cure period of about two hours. The cure pressure is exerted through the vacuum bag 76 to bias the IML surface of the inner cap 122 into engagement with the respective surfaces of the outer shell 120, cured foam core 72 stabilized combination to ensure a complete adhesive bond therebetween. A reduced cure pressure, e.g., 45 psi as opposed to 75 psi, is preferably used for the second-stage cure cycle to reduce the risk of collapse of the cured foam core 72 during second-stage curing cycle. It will be appreciated, however, that higher cure pressures may be utilized if desired since the cured foam core 72 has been fabricated to withstand such higher pressures.

Figure 7A:
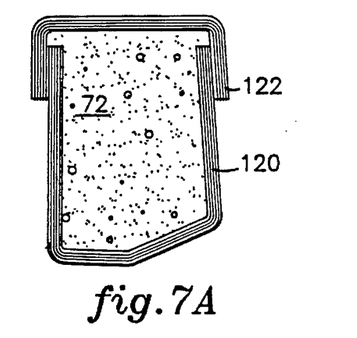
FIGS. 7A–7C are exemplary cross-sectional views of the finished structural framework fabricated utilizing the two-stage co-cure method according to the present invention.
Figure 7B:
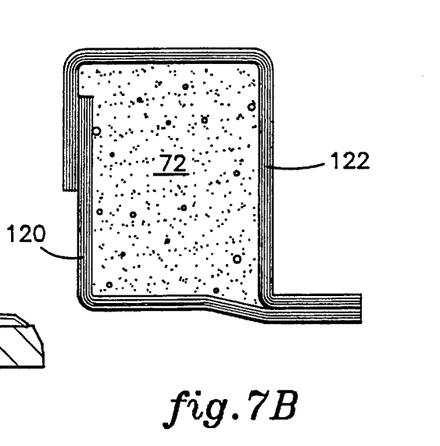
Figure 7C:
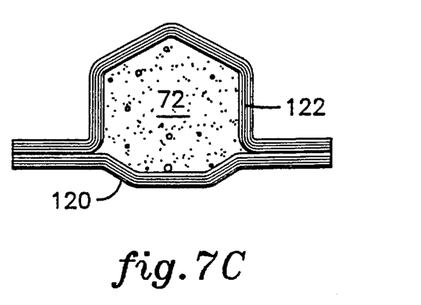

After the second-stage cure period has elapsed, the vacuum bag 76 is removed from the base mold member 52 in the initial substep of the demolding step 50. The cured structural framework 100 is then removed from the base mold member 52 to complete the two-stage co-cure method 10 according to the present invention. FIGS. 7A–7C are exemplary crosssectional views of the finished structural framework 100.

A variety of modifications and variations of the present invention are possible in light of the above teachings. It is therefore to be understood that, within the scope of the appended claims, the present invention may be practiced otherwise than as specifically described hereinabove.

What is claimed is:

1. A two-stage co-cure method for fabricating a composite article having a box-beam cross-sectional configuration, comprising the steps of:

setting up a molding assembly that defines an outer mold line surface of an outer shell of the composite article;

laying up prepreg plies that form the outer shell in the molding assembly;

vacuum-bagging the layed-up molding assembly;

subjecting the vacuum-bagged molding assembly to elevated temperature and pressure to cure the layed-up prepreg plies to form the outer shell of the composite article;

de-bagging the vacuum-bagged molding assembly;

reconfiguring the molding assembly as required so that the reconfigured molding assembly and the outer shell in combination define a foam injection cavity;

securing cover plates in combination with the reconfigured molding assembly to close the foam injection cavity;

injecting foam into the foam injection cavity to form an outer shell, cured foam core stabilized combination that defines an inner mold line surface of an inner cap;

removing the cover plates from the reconfigured molding assembly and disassembling the reconfigured molding assembly to expose the outer shell, cured foam core stabilized combination;

applying film adhesive to the exposed outer shell, cured foam core stabilized combination in the disassembled molding assembly;

laying up prepreg plies that form the inner cap of the composite article onto the outer shell, cured foam core stabilized combination in the disassembled molding assembly;

vacuum-bagging the prepreg plies layed up on the outer shell, cured foam core stabilized combination in the disassembled molding assembly; and subjecting the vacuum-bagged disassembled molding assembly to elevated temperature and pressure to cure the layed-up prepreg plies to form the inner cap of the composite article and to concomitantly cause the applied film adhesive to fuse wherein the inner cap and the outer shell are adhesively bonded in combination to form the composite article.

2. The two-stage co-cure method of claim 1 wherein the molding assembly set-up step further comprises the steps of:

providing a base mold member having contoured molding surfaces; and mounting at least one primary mandrel having a mandrel molding surface in combination with the base mold member wherein the contoured molding surfaces of the base mold member and the at least one mandrel molding surface in combination define the outer mold line surface of the outer shell.

3. The two-stage co-cure method of claim 2 further comprising the step of:

applying a mold release agent to the contoured molding surfaces of the base mold member and the at least one mandrel molding surface.

4. The two-stage co-cure method of claim 1 wherein the molding assembly reconfiguration step comprises:

mounting at least one secondary mandrel in combination with the molding assembly wherein the at least one secondary mandrel and the outer shell in combination define the foam injection cavity.

5. A two-stage co-cure method for fabricating a structural framework for a canopy assembly having a box-beam cross-sectional configuration, comprising the steps of:

providing a base mold member having contoured molding surfaces;

mounting a plurality of primary mandrels having mandrel molding surfaces in combination with the base mold member wherein the contoured molding surfaces of the base mold member and mandrel molding surfaces in combination define an outer mold line surface of an outer shell of the structural framework and the base mold member and the plurality of primary mandrels define a female molding assembly;

laying up prepreg plies that form the outer shell in the female molding assembly;

vacuum-bagging the layed-up female molding assembly;

subjecting the vacuum-bagged female molding assembly to elevated temperature and pressure to cure the layed-up prepreg plies to form the outer shell of the structural framework;

de-bagging the vacuum-bagged female molding assembly;

mounting secondary mandrels as required in combination with the female molding assembly for reconfiguration thereof wherein the secondary mandrels and the outer shell in combination and the outer shell define a foam injection cavity;

securing cover plates in combination with the primary and secondary mandrels to close the foam injection cavity;

injecting foam into the foam injection cavity to form an outer shell, cured foam core stabilized combination that defines an inner mold line surface of an inner cap;

disassembling the female molding assembly by removing the cover plates, the primary mandrels, and the secondary mandrels;

applying film adhesive to the outer shell, cured foam core stabilized combination in the base mold member;

laying up prepreg plies that form the inner cap of the structural framework onto the outer shell, cured foam core stabilized combination;

vacuum-bagging the prepreg plies layed up on the outer shell, cured foam core stabilized combination in the base mold member; and subjecting the vacuum-bagged outer shell, cured foam core stabilized combination in the base mold member to elevated temperature and pressure to cure the layed-up prepreg plies to form the inner cap of the structural framework and to concomitantly cause the applied film adhesive to fuse wherein the inner cap and the outer shell are adhesively bonded in combination to form the structural framework of the canopy assembly.

* * * * *